A. H. ROIKJER.
BACK LOCK FOR CAMERAS.
APPLICATION FILED JULY 1, 1920.

1,389,164.

Patented Aug. 30, 1921.

Inventor
Andrew H. Roikjer.

By Jerry A Mathews
Lester L Sargent
Attorneys

UNITED STATES PATENT OFFICE.

ANDREW H. ROIKJER, OF BOISE, IDAHO.

BACK-LOCK FOR CAMERAS.

1,389,164.  Specification of Letters Patent.  Patented Aug. 30, 1921.

Application filed July 1, 1920. Serial No. 393,323.

*To all whom it may concern:*

Be it known that I, ANDREW H. ROIKJER, a citizen of the United States, residing at Boise, in the county of Ada and State of Idaho, have invented a new and useful Back-Lock for Cameras, of which the following is a specification.

The object of my invention is to provide an improved back lock for film cameras in which a film having a cut out leader is utilized to lock the back to the camera during the period that the film is being wound. This application is an improvement upon my copending application Serial No. 267,045, filed December 16, 1918.

I attain the objects of my invention by the mechanism illustrated in the accompanying drawings, in which—

Like numerals designate like parts in each of the several views.

Figures 1, 2, 3:
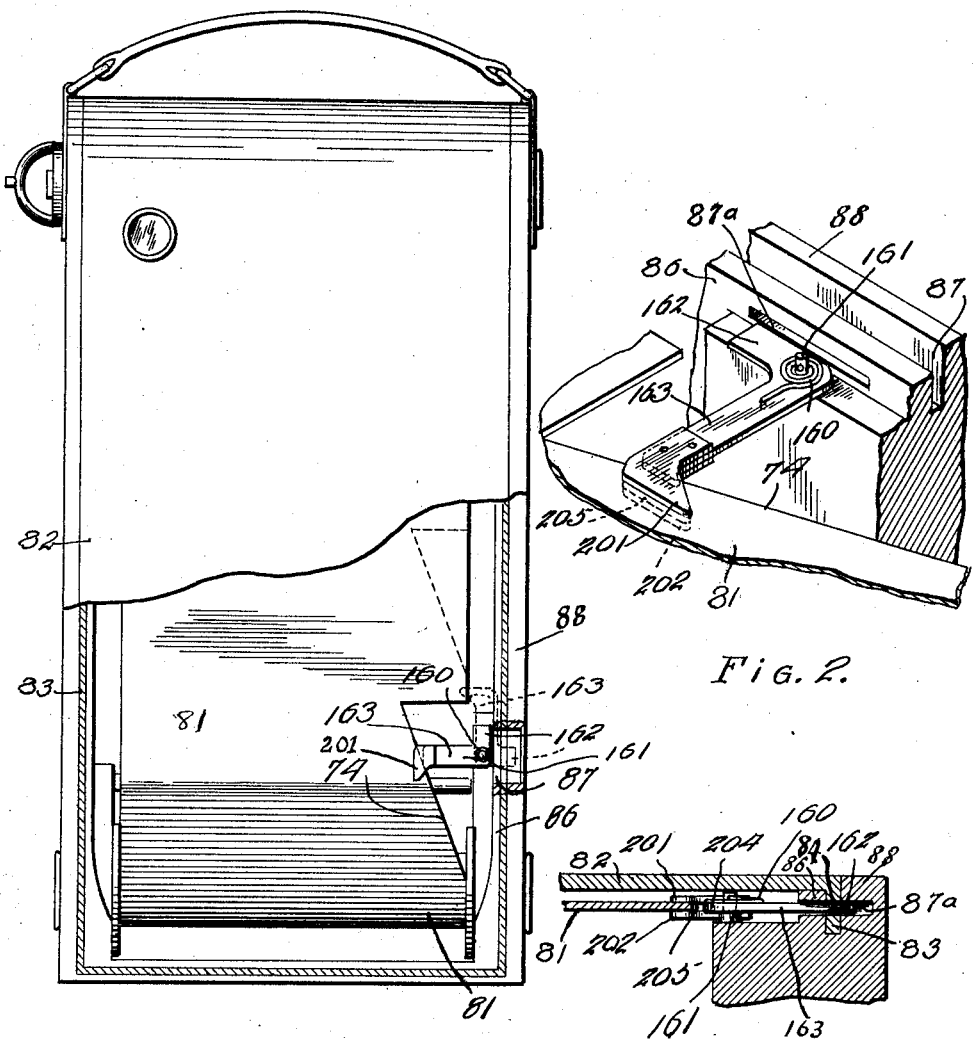
Figure 1 is a plan view of the invention, with a portion of the back of the camera broken away.
Fig. 2 is an enlarged detailed perspective view of the device.
Fig. 3 is an edge view, the camera casing and film however being shown in section.

Referring to the accompanying drawings, I provide a film 81 having the usual headpiece or leader of paper, in which portion I provide a notch or cut-out 74, preferably of the shape shown.

I provide the camera back 82 having side flanges 83 adapted to fit in a corresponding groove 87 on each side of the body of the camera, that is between walls 86 and 88, and having a locking slot 84, shaped to receive a locking member to be described.

I provide a pivoted L-shaped locking member 163, mounted on the camera wall by means of pivot 161 and normally held in the position shown in Fig. 2 by means of a suitable spring 160. The film-engaging end of member 163 is provided with spaced film guiding members 201 and 202, forming the slot 205 into which the edge of the film glides. The inner wall 86 of the camera is provided with a suitable slot 87$^a$, suitably positioned and of suitable size to permit of the end 162 of member 163 entering the slot as the member 163 is swung to the position shown in dotted lines in Fig. 1.

When the film is pulled forward by the winding of the film, the film edge of the slotted portion 74 will glide into the slot 205 of member 163, and will then carry with it member 163 from the position shown in full lines to the position shown in dotted lines in Fig. 1, in which latter position member 162 is swung into slot 87$^a$ engaging a corresponding opening 84 which is provided in one of the side flanges 83 in the camera back, and locking the camera back on the camera so that it cannot be removed until all the film has been wound on the film spool. When this is done member 163 will spring back to its original position, unlocking the camera back from the camera.

As shown in Fig. 1, when the locking member 163 is in the cut-out portion 74 of the film, if any further winding is attempted member 162 would extend through the slot 87$^a$ of wall 86, in which position it would not be possible to replace the back on the camera.

An important feature of this improvement for a camera manufacturer who desires to put out a distinctive film is that it makes it inconvenient for the amateur photographer to substitute a film of a different make having an unnotched leader portion.

What I claim is:

1. In a camera adapted to be used with a film having a cutout or notched portion in its leader, the combination of a spring-controlled locking element adapted to engage the cutout portion of the leader and to be swung from a non-locking to a locking position by the winding of the film, and a camera back having a slotted portion adapted to be engaged by the aforesaid locking element when the leader portion of the film is wound, whereby to lock the camera back to the camera until the completion of the winding of the film.

2. In a camera, the combination with the camera of a removable back having a slot, a pivoted locking member adapted to be swung into engagement with the slot, said pivoted locking member being released from locking position by a notched portion of the leader portion of the film.

3. In a camera adapted for use with a film having a cut out or notched leader portion, the combination with the camera of a removable back having side flanges, one of said side flanges having a slot, the inner wall of the camera having a corresponding alined slot, an L-shaped pivoted locking member mounted on the wall of the camera and positioned to have one of its ends swingable into the aforesaid slots, and resilient means tending to move the L-shaped pivoted locking member to unlocked position.

4. In an apparatus of the class described, in combination with a camera having a removable back, the back having a slotted side flange, an L-shaped locking member pivotally mounted on the inner wall of the camera and positioned to move into and out of locking engagement with the slotted side flange of the camera back, said locking member having end guiding elements spaced to engage one on one side and the other on the other side of the edge of the film.

5. In combination with the apparatus described in claim 4, a coil spring engaging the said L-shaped member and normally pressing same toward unlocking position.

ANDREW H. ROIKJER.